(12) United States Patent
Nebeker (10) Patent No.: US 8,986,424 B2
(45) Date of Patent: Mar. 24, 2015

(54) RHENIUM RECOVERY

(75) Inventor: Neil Nebeker, Hayden, AZ (US)

(73) Assignee: Asarco LLC, Tuscon, AZ (US)

( * ) Notice: Subject to any disclaimer, the term of this patent is extended or adjusted under 35 U.S.C. 154(b) by 669 days.

(21) Appl. No.: 13/331,571

(22) Filed: Dec. 20, 2011

(65) Prior Publication Data

US 2012/0152063 A1 Jun. 21, 2012

Related U.S. Application Data

(60) Provisional application No. 61/425,057, filed on Dec. 20, 2010.

(51) Int. Cl.
*C22B 61/00* (2006.01)
*B01D 15/36* (2006.01)
*B01D 15/42* (2006.01)

(52) U.S. Cl.
CPC .............. *C22B 61/00* (2013.01); *B01D 15/361* (2013.01); *B01D 15/424* (2013.01)
USPC ................ 75/711; 423/22; 210/677; 210/679

(58) Field of Classification Search
CPC ..... C22B 61/00; B01D 15/424; B01D 15/361
USPC .......................... 75/711; 423/22; 210/679, 677
See application file for complete search history.

(56) References Cited

U.S. PATENT DOCUMENTS

| | | | |
|---|---|---|---|
| 2,876,065 A | | 3/1959 | Zimmerley et al. |
| 3,458,277 A | * | 7/1969 | Prater et al. .................. 423/21.1 |
| 3,915,690 A | | 10/1975 | Ammann |
| 5,849,172 A | * | 12/1998 | Allen et al. .................... 205/581 |
| 2001/0001650 A1 | | 5/2001 | Duyvesteyn et al. |

OTHER PUBLICATIONS

International Search Report dated Apr. 13, 2012 for PCT Application No. PCT/US2011/066172, 3 pages.
Written Opinion of the International Searching Authority dated Apr. 13, 2012 for PCT Application No. PCT/US2011/066172, 7 pages.

* cited by examiner

*Primary Examiner* — George Wyszomierski
*Assistant Examiner* — Tima M McGuthry Banks
(74) *Attorney, Agent, or Firm* — Fennemore Craig, P.C.

(57) ABSTRACT

Method for rhenium recovery from copper solvent extraction solution. It is determined whether the copper solvent extraction solution contains trace amounts of rhenium. If so, a feedstock from the copper solvent extraction solution is provided, which is then filtered, producing filtered feedstock. Trace amounts of rhenium are absorbed from the filtered feedstock using a supply of ion exchange resin selective for rhenium. The ion exchange resin is washed. Trace amounts of rhenium are eluted from the ion exchange resin using a first amount of eluent, a second amount of eluent and a third amount of eluent. The first amount and the third amount of eluent produce supplemental feedstock and the second amount of eluent produces rhenium eluate. The rhenium eluate is collected and the ion exchange resin is protonated.

23 Claims, 8 Drawing Sheets

RHENIUM RECOVERY

CROSS-REFERENCES TO RELATED APPLICATIONS

This application claims priority to provisional U.S. Patent Application Ser. No. 61/425,057, filed Dec. 20, 2010, which is incorporated by reference as though fully set forth herein.

FIELD OF THE INVENTION

This invention relates to methods for extracting metals from raw ore generally and more specifically to processes for recovering trace amounts of rhenium from copper solvent extraction solutions.

BACKGROUND OF THE INVENTION

Rhenium, a scarce refractory metal, is not naturally occurring, but rather must be extracted as a byproduct of copper or molybdenum mining. Rhenium is not very reactive, reacting only slightly with nitric acid ($HNO_3$) and not at all with hydrochloric acid (HCl) or sodium hydroxide (NaOH), for example. Rhenium is often found with molybdenum as part of a copper porphyry deposit. Commonly, rhenium is recovered from the flue gases emitted during roasting of molybdenite concentrates after subjecting the flue gases to quench liquors. Rhenium has also been known to have been recovered from uranium leach solutions.

BRIEF SUMMARY OF THE INVENTION

The following summary is provided as a brief overview of the claimed product and process. It shall not limit the invention in any respect, with a detailed and fully-enabling disclosure being set forth in the Detailed Description of the Invention section. Likewise, the invention shall not be restricted to any numerical parameters, processing equipment, chemical reagents, operational conditions, and other variables unless otherwise stated herein.

In an embodiment of the present invention, a method of recovering rhenium from copper solvent extraction solution, comprises: determining whether the copper solvent extraction solution contains trace amounts of rhenium; if the copper solvent extraction solution contains trace amounts of rhenium, providing a feedstock from the copper solvent extraction solution; filtering the feedstock, producing filtered feedstock; absorbing the trace amounts of rhenium from the filtered feedstock using a supply of ion exchange resin selective for rhenium; washing the supply of the ion exchange resin; eluting trace amounts of rhenium from the ion exchange resin using a first amount of eluent, a second amount of the eluent and a third amount of the eluent, the first amount and the third amount producing supplemental feedstock and the second amount producing rhenium eluate; collecting the rhenium eluate; and after the eluting, protonating the ion exchange resin.

In another embodiment, the method of the present invention for recovering rhenium from copper solvent extraction solution, comprises: determining whether the copper solvent extraction solution contains molybdenum and trace amounts of rhenium; if the copper solvent extraction solution contains molybdenum and trace amounts of rhenium, providing a feedstock from the copper solvent extraction solution; filtering the feedstock, producing filtered feedstock; absorbing the trace amounts of rhenium but not the molybdenum from the filtered feedstock using a supply of ion exchange resin selective for rhenium but not for molybdenum; washing the supply of the ion exchange resin; eluting trace amounts of rhenium from the ion exchange resin using a first amount of eluent, a second amount of the eluent and a third amount of the eluent, the first amount and the third amount producing supplemental feedstock and the second amount producing rhenium eluate; after the eluting of trace amounts of rhenium, protonating the ion exchange resin; and collecting the rhenium eluate.

BRIEF DESCRIPTION OF THE DRAWINGS

Illustrative and presently preferred exemplary embodiments of the invention are shown in the drawings in which.

DETAILED DESCRIPTION OF THE INVENTION

While known methods for recovering rhenium have concentrated on the byproducts of flue gases from molybdenite roasting and copper smelting, it is believed that rhenium has not been previously removed from copper solvent extraction (SX) feed solutions containing rhenium. It was not previously appreciated that copper SX solutions contained trace amounts of rhenium (as perrhenic acid ($HReO_4$)) that could be detected and then removed. As used herein, "trace amounts" means from about 0.1 parts per million (ppm) to about 0.8 ppm of copper SX solutions. These trace amounts of rhenium are so minute as to pass through an SX system without detection. For example, sulfur in the SX system occurs in a concentration that is about 10,000 that of rhenium, the concentration of rhenium being minute in comparison to the volumes of fluid and chemicals that flow through an SX system.

Thus, the system 10 and method 100 of the present invention comprise recovering rhenium in trace amounts from SX solution feedstock 12, including copper pregnant leach solution (PLS) 14 or copper raffinate 16, where it is known or ascertained that the SX feed solution, or feedstock 12, contains trace amounts of rhenium. The present invention will now be described with reference to various embodiments of system 10. System 10 generally comprises feedstock 12, filter system 19, ion exchange system 22 and regeneration system 32.

Figure 1:
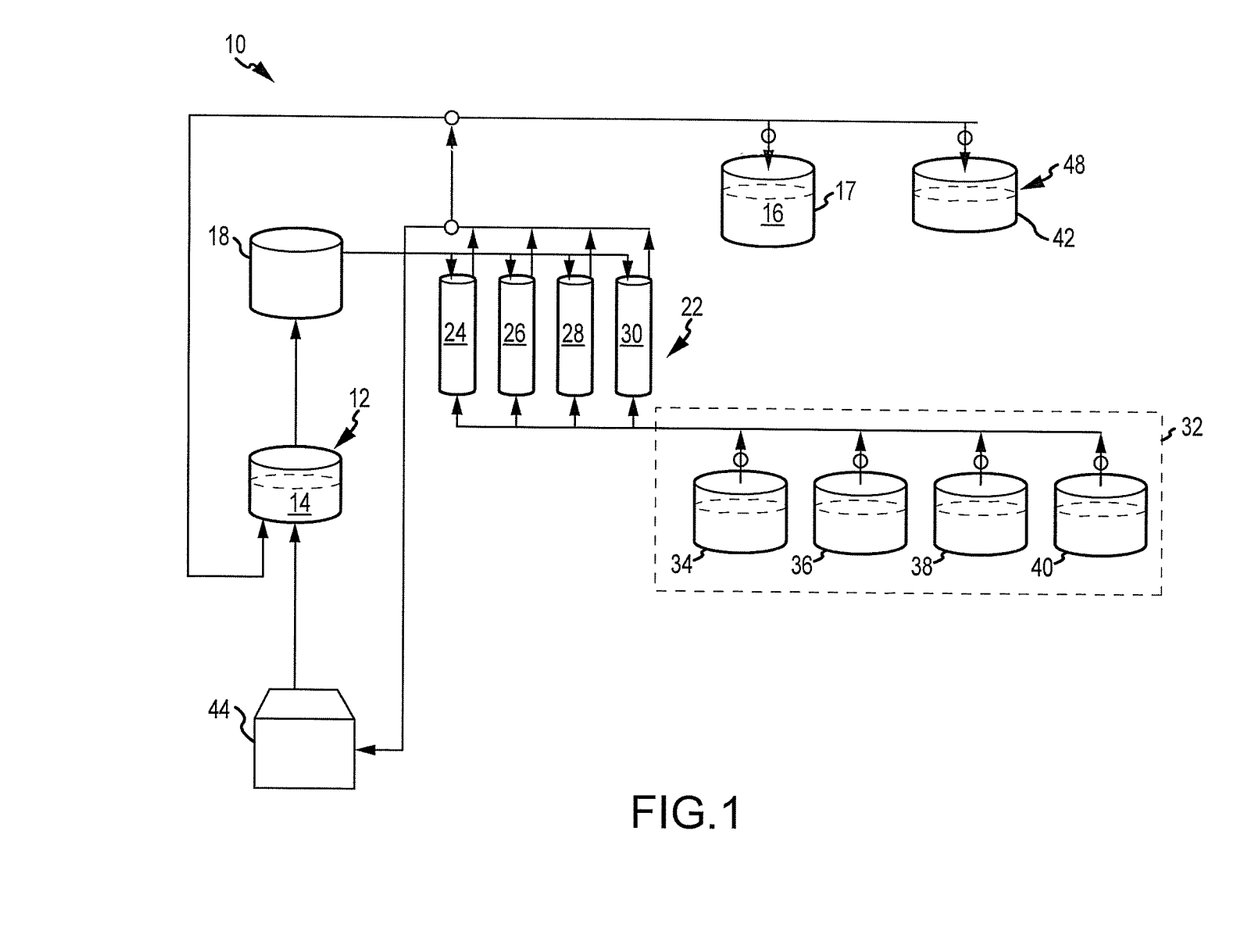
FIG. 1 shows an embodiment of the system of the present invention in which the feedstock comprises copper pregnant leach solution (PLS)

With reference to FIG. 1, the feedstock 12 supply inlet is fluidically connected to SX system 44 from which feedstock 12 (e.g., PLS) is provided. Feedstock 12 supply is fluidically connected to an inlet to filter system 19. An outlet of filter system 19 is connected fluidically to ion exchange system 22

(loaded with ion exchange resin) so that ion exchange system 22 receives filtered feedstock 12. Regeneration system 32 is connected fluidically to an outlet end of ion exchange system 22 to permit elution of trace amounts of rhenium from the ion exchange resin, as well as regeneration of the ion exchange resin so that additional quantities of feedstock 12 can be processed in system 10 according to embodiments of method 100, 200 of the present invention.

In an embodiment shown in FIG. 1, feedstock 12 comprises PLS 14. To begin with, copper ore (e.g., chalcopyrite or other copper ore) is leached with a weak concentration of strong acid, such as sulfuric acid ($H_2SO_4$). Acid concentrations in the PLS 14 may range from about less than one (but above zero) to about 200 grams per liter (g/L), typically ranging from about 1 g/L to less than about 5 g/L and often ranging from about 1 g/L to about 2 g/L. Following leaching, a slip stream of the PLS 14 may be removed from the SX circuit of SX system 44 (prior to addition of organic) to serve as feedstock 12 for rhenium recovery according to the present invention. Thus, in system 10, SX system 44 is connected to feedstock 12 supply by which the slip stream of PLS 14 is provided. The pH of PLS is around 1.8 to around 2.0, but could be as high as about 4 or as low as about 1 according to embodiments of the present invention. PLS 14 also comprises trace amounts of rhenium, copper in the amount of about 0.2 g/L to about 10 g/L, and molybdenum in an amount of fewer than 20 parts per million (ppm). Where molybdenum is present in PLS 14 (or raffinate 16) in amounts greater than 20 ppm, another embodiment of the invention may be used to extract trace amounts of rhenium nonetheless, as is explained in more detail below.

Figure 3:
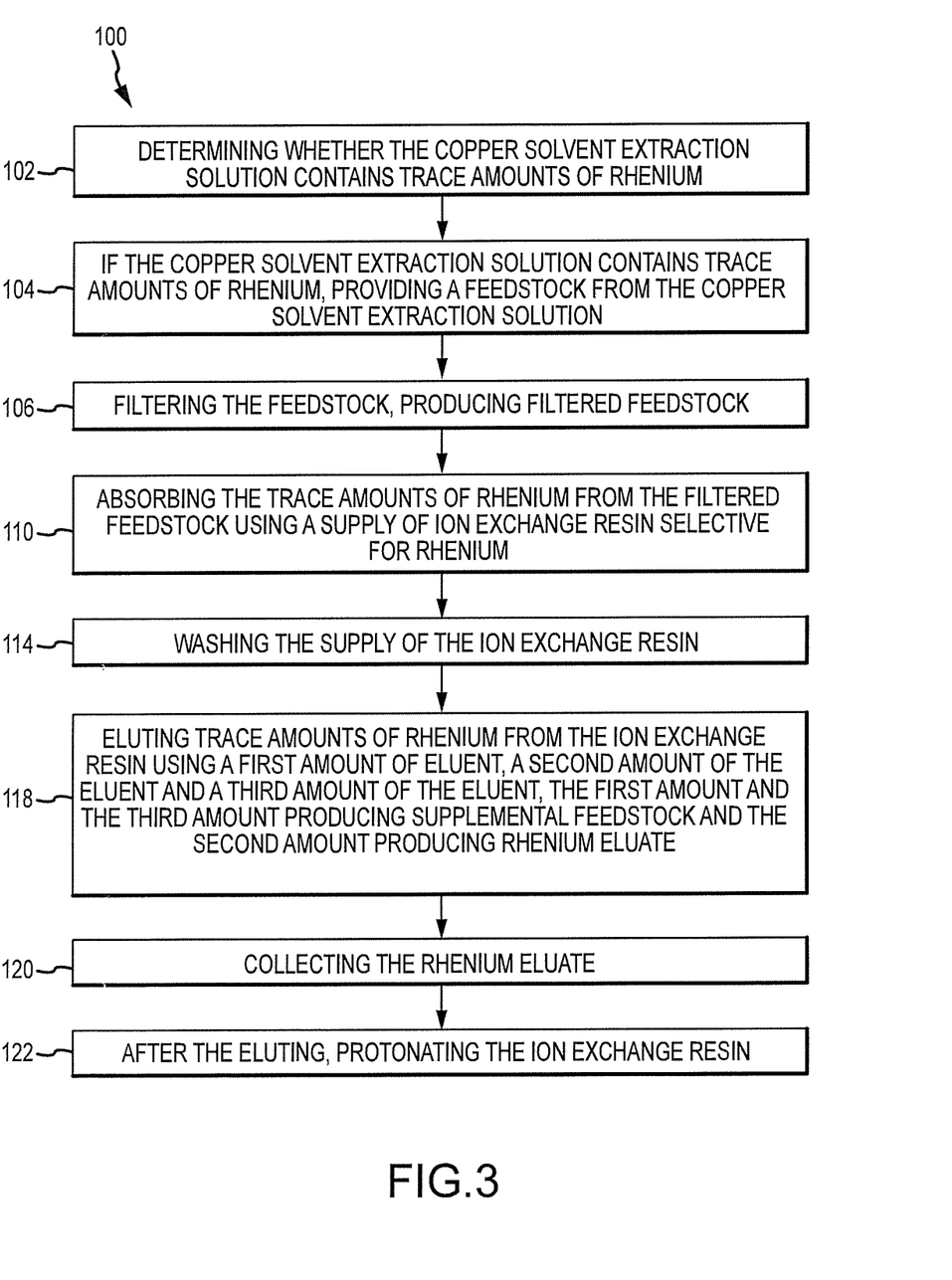
FIG. 3 shows an embodiment of the method of the present invention for extracting trace amounts of rhenium from a copper solvent extraction solution.

Once the feedstock 12 in the form of PLS 14 has been supplied from SX system 44, PLS 14 is filtered in filter system 19. As shown in FIG. 1, filter system 19 comprises filter 18 that is used to remove solids from the PLS 14. Filter 18 may comprise any known means for filtering solids; however, activated charcoal many not be used, as is explained in more detail below. In another embodiment in which feedstock 12 comprises raffinate 16, filter system 19 further comprises entrained organic filter 20, as shown in FIG. 3. Again, activated charcoal may not be used.

After filtration, the feedstock is ready to be sent to ion exchange system 22. In the embodiment shown in FIGS. 1-2, the ion exchange system 22 comprises four ion exchange columns 24, 26, 28 and 30 connected in parallel and loaded with ion exchange resin, although other arrangements are possible. In another embodiment in which rhenium eluate contains at least one of a sulfate or a chloride, ion exchange system 22 may further comprise a supplemental column(s) loaded with ion exchange resin for re-extracting rhenium, as explained in more detail below.

In the embodiment shown in FIG. 1, the ion exchange resin comprises a weak base anion resin selective to hydrophobic, heavy metal anions (e.g., rhenium), such as Purolite® A170, which is commercially available from The Purolite Company of Bala Cynwyd, Pa., USA. Thermax 403 resin commercially available from Thermax Ltd. of India or its distributors may also be used. These resins are also selective for molybdenum; therefore, these resins may be used if the amount of molybdenum in the PLS 14 is low (e.g., less than about 20 ppm). Otherwise, the presence of the molybdenum would interfere with the operation of the resin as part of the present invention. In another embodiment shown in which PLS 14 also comprises molybdenum in an amount greater than 20 ppm, the ion exchange resin comprises a weak base anion ion exchange resin that may be of the polystyrenic gel type that is selective to rhenium, but not to molybdenum, such as Purolite® A172, which is commercially available from The Purolite Company of Bala Cynwyd, Pa., USA. Thermax 406 resin commercially available from Thermax Ltd. of India or its distributors may also be used. Other similar weak base ion exchange resins may also be used as would be obvious to one of ordinary skill in the art after becoming familiar with the teachings of the present invention.

Once the columns 24, 26, 28 and 30 are loaded, the filtered PLS 14 is introduced to the ion exchange system 22 where the trace amounts of rhenium will load onto the ion exchange resin. After the PLS 14 has been introduced into the ion exchange system 22 according to method 100 of the present invention, the ion exchange resin is ready to be regenerated using regeneration system 32. Regeneration system 32 comprises reverse osmosis unit 34, eluent tank 38 and protonation acid tank 40, and may also include optional pre-eluent tank 36. The components of the regeneration system are fluidically connected to the ion exchange system 22 to permit backwash of the ion exchange system 22 in a direction countercurrent to the direction in which the feedstock 12 is loaded into the columns 24, 26, 28, 30.

Reverse osmosis unit 34 comprises water that has been decontaminated using reverse osmosis; however, other means for providing decontaminated water may also be used. Eluent tank 38 contains eluent which comprises a supply of strong base in solution, such as NaOH. In one embodiment, 1.0 molar (M) NaOH was used for eluent. As used herein, "strong base" means any base that completely disassociates in water into a cation and the hydroxide ion (OFF), including NaOH, lithium hydroxide (LiOH), potassium hydroxide (KOH), rubidium hydroxide (RbOH) and cesium hydroxide (CsOH). However, barium hydroxide ($BaOH_2$) may not be used as it will combine with any sulfates that are present to form an insoluble sulfate salt. While ammonia ($NH_3$) may have typically been used as part of prior art methods to produce ammonium perrhenate ($NH_4ReO_4$), $NH_3$ may not be used with PLS 14 since $NH_3$ complexes the copper yet to be removed from the PLS 14. As will be discussed in more detail below, use of eluent has several purposes, one of which is elution of rhenium from the ion exchange resin. Regeneration system 32 further comprises the supply of protonation acid 40. Protonation acid 40 comprises sulfuric acid ($H_2SO_4$) in solution, which is used to regenerate the ion exchange resin by protonating it. In one embodiment, the protonation acid was $H_2SO_4$ in a concentration of 5 g/L. Other strong acids (e.g., hydrochloric acid (HCl), hydrogen bromide (HBr), hydrogen iodide (HI), nitric acid ($HNO_3$) and perchloric acid ($HClO_4$)) may not be used, as they each would interfere with the operation of method 100, 200. Halogen ions (from HCl, HBr or HI) are attracted to the weak base anion ion exchange resin and would occupy sites that could otherwise be occupied by rhenium (e.g., as $HReO_4$). In addition, $HNO_3$ and $HClO_4$ are oxidizing agents which would also interfere with extraction of rhenium, as well.

In one embodiment, regeneration system 32 comprises optional supply of pre-eluent 36. Pre-eluent 36 comprises a weak concentration of strong base, such as NaOH, although other strong bases could be used. In one embodiment, pre-eluent comprises 0.25 M NaOH. Pre-eluent 36 is used to address sulfate ion ($SO_4^{2-}$) and chloride ion ($Cl^-$) contamination typically prior to elution of rhenium in combined form.

As shown in FIG. 1, an outlet end of ion exchange system 22 is also fluidically connected to SX system 44, raffinate tank 17 and eluate collection vessel 42 to receive various fluid flows from the regeneration system 32 after they have passed through the ion exchange system 22, as will be explained in more detail below.

In another embodiment of system 10, feedstock 12 comprises rhenium, as well as molybdenum in quantities greater than 20 ppm. In the embodiment described, the ion exchange resin comprises a weak base anion resin, which may be a polystyrenic gel type resin selective for rhenium but not for molybdenum, such as Purolite® A172 resin which is commercially available from The Purolite Company. Thus, eluate comprises rhenium and the molybdenum passes through ion exchange system 22 to be recycled as feedstock 12 or collected as raffinate 16, as shown in FIG. 1.

Figure 2:
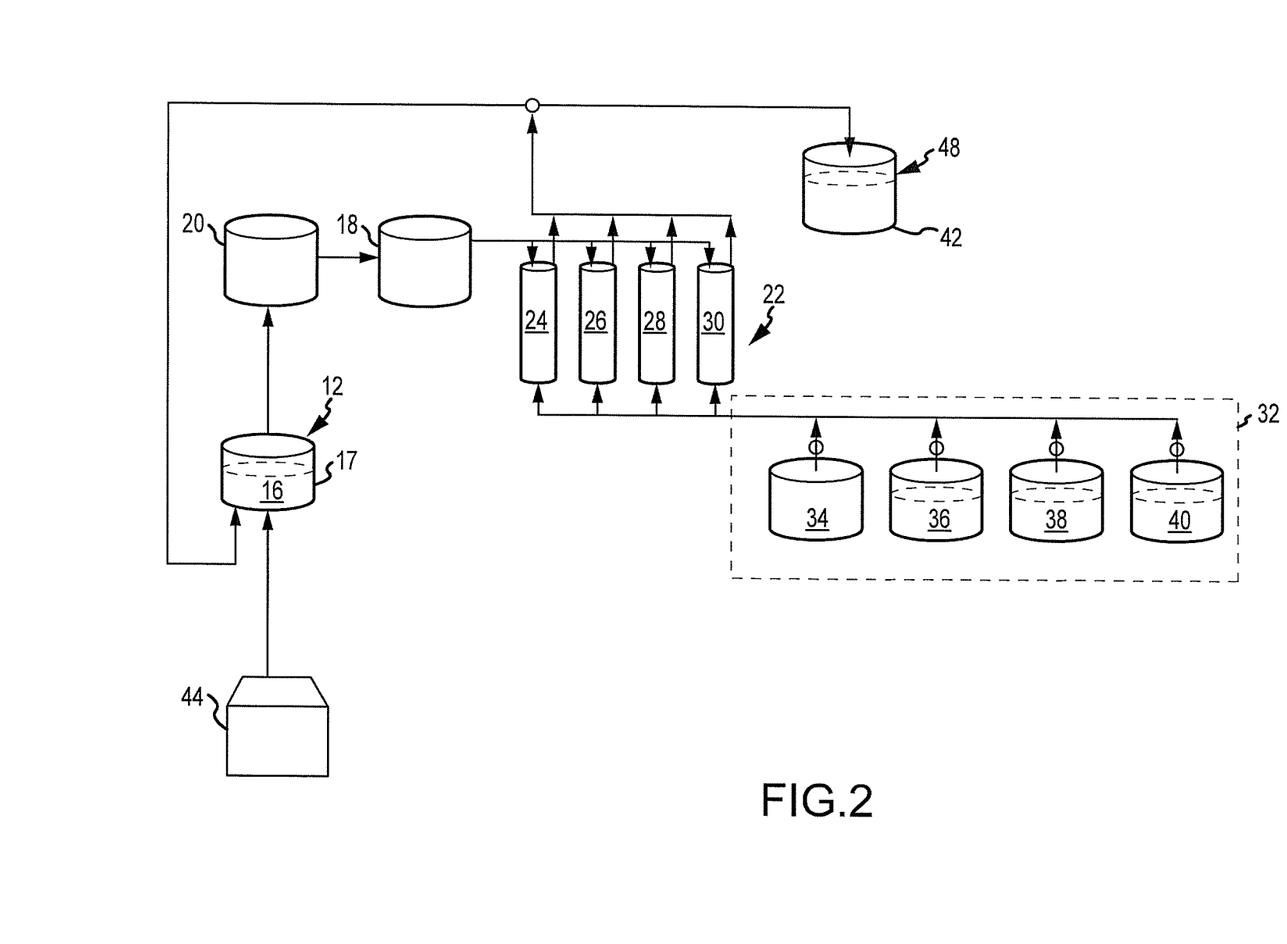
FIG. 2 shows an embodiment of the system of the present invention in which the feedstock comprises copper raffinate.

The embodiment shown in FIG. 2 is similar to the embodiment shown in FIG. 1 with at least the differences described herein. In the embodiment shown in FIG. 2, feedstock 12 comprises raffinate 16. Raffinate tank 17 has an inlet for receiving raffinate 16 from SX system 44 and an outlet for delivering raffinate 16 to filter system 19. In the embodiment shown, filter system 19 comprises entrained organics filter 20 and filter 18, which has been previously described. Entrained organics are removed from raffinate 16 via entrained organics filter 20, which may comprise an ion exchange resin suitable to remove entrained organics, entrained organics filter 20 may not include activated charcoal. Activated charcoal was found to interfere with the desired chemical reactions of the claimed invention by absorbing rhenium. In addition, in the embodiment shown in FIG. 2, the ion exchange system 22 is not connected to the SX system 44 for recycling of fluids from regeneration system 32, since the feedstock 12 comprises raffinate 16.

As would be familiar to one of ordinary skill in the art after becoming familiar with the teachings of the present invention, system 10 is also equipped with a series of valves and pumps to permit or cause fluid flow from the proper containers to the ion exchange system 22, for example, and back to SX system 44 or to the raffinate 16 flow or to the eluate 42 collection vessel in accordance with method 100, 200. In addition, while in the embodiments of system 10 and method 100, 200 described herein various apparatus may be denoted as tanks or vessels, the present invention should not be viewed as limited to any particular apparatus, since the raffinate 16, for example, may be recycled as part of a circuit directly into another system without necessarily putting raffinate 16 in raffinate tank 17 as shown in FIG. 1, for example.

Having described system 10, embodiments of method 100 will now be described with reference to FIG. 3. Embodiments of method 100 vary based on the composition or type of feedstock 12 employed. Either PLS 14 or raffinate 16 may be used with some variation, because, unlike many other SX processes, embodiments of method 100 are not affected by the presence of copper. Copper may be removed before (e.g., such as in raffinate 16) or after (such as in PLS 14) trace amounts of rhenium are removed in accordance with embodiments of method 100.

In embodiments illustrated in FIGS. 1-2, method 100 comprises determining 102 whether the copper SX solution (e.g., PLS 14 or raffinate 16) contains trace amounts of rhenium, but not molybdenum in amounts greater than 20 ppm. If the copper SX solution contains such trace amounts of rhenium, method 100 comprises providing 104 feedstock 12 from the copper SX solution. Providing 104 feedstock may comprise removing a slip stream of PLS 14 from SX system 44 for rhenium recovery prior to the addition of organic to the PLS. In an embodiment in which feedstock 12 comprises raffinate 16, raffinate 16 may be diverted from SX system 44 at or near the end of the SX circuit. In either case, it is not necessary to adjust the pH of either the PLS 14 or the raffinate 16 as embodiments of method 100 work without adjusting the pH of feedstock 12 since the method 100 of the present invention can be performed in an environment of a pH of about 4.0 or lower.

Method 100 further comprises filtering 106 the feedstock 12 to produce filtered feedstock. In an embodiment in which feedstock 12 comprises PLS 14, filtering 106 comprises filtering 106 according to known methods for removing solids. In one embodiment in which feedstock 12 comprises PLS 14, PLS 14 is supplied to filter system 19 where it is filtered by filter 18. In another embodiment of method 100 in which feedstock 12 comprises raffinate 16, filtering 106 also includes removing entrained organic which can foul the weak base anion exchange resin used to absorb trace amounts of rhenium. Thus, in the embodiment shown in FIG. 2, for example, raffinate 16 from raffinate tank 17 is supplied to filter system 19, comprising filter 18 and entrained organics filter 20. Raffinate 16 is filtered 106 in filter 18 to remove solids and entrained organics filter 20 to remove entrained organic, producing filtered feedstock 12. By way of example, removing entrained organic may be accomplished with an ion exchange resin selective for entrained organic. In addition, filtering 106 does not include use of any activated charcoal. It is now appreciated that activated charcoal absorbs rhenium and negatively affects operation of method 100, 200.

Method 100 further comprises providing a supply of the weak base anion ion exchange resin selective to rhenium as previously described which is loaded into columns 24, 26, 28, 30 of ion exchange system 22, connected in parallel, as shown in FIGS. 1-2. In one embodiment, once the columns 24, 26, 28, 30 have been loaded with the weak base anion resin, filtered feedstock 12 is fed into the columns 24, 26, 28, 30 in a first direction at a rate of between about 0.5 bed volumes per hour (BVH) to about 8 BVH, with about 5 BVH being preferred and a BVH being 1 m³ of solution/1 m³ of resin. In one embodiment, filtered feedstock 12 was fed into the columns 24, 26, 28, 30 from top to bottom. Feeding of the filtered feedstock 12 continues until rhenium begins coming out of the columns 24, 26, 28, 30, which occurs after about 6,000 bed volumes of filtered feedstock. In one embodiment, this took about 45 days. Thus, method 100 further comprises absorbing 110 the trace amounts of rhenium from the filtered feedstock 12 using the supply of weak base anion ion exchange resin selective for rhenium. The weak base anion ion exchange resin has a nitrogen ion with two unshared electrons which attract the positive hydrogen of HReO4. In an embodiment in which filtered feedstock 12 comprises PLS 14, the filtered PLS 14 that passes through the ion exchange system 22 may be recycled to the SX system 44 for copper extraction and/or molybdenum extraction if the PLS contains sufficient quantities of molybdenum, as shown in FIG. 1. As shown in FIG. 2, in an embodiment in which feedstock 12 comprises raffinate 16, the filtered raffinate 16 that passes through the ion exchange system 22 may be recycled as raffinate 16 to raffinate tank 17 as feedstock 12.

Following the absorbing 110 step, method 100 further comprises washing 114 the supply of the weak base anion ion exchange resin with decontaminated water (e.g., water that has been subjected to reverse osmosis) until substantially all of the filtered feedstock 12 has been displaced. In one embodiment of method 100, the washing 114 with decontaminated water is performed in a second direction countercurrent to the first direction in which feedstock 12 was loaded into the columns 24, 26, 28, 30. In embodiment, the second direction was from the bottom of columns 24, 26, 28, 30 to the top. The wash water exiting from the ion exchange system 22 may be recycled as raffinate 16, as shown in FIGS. 1-2.

Method 100 may also include the optional step of pre-eluting at least one of sulfate ions or chloride ions from the weak base anion ion exchange resin. Sulfate ions and chloride ions should be removed from the feedstock 12 to ensure efficient operation of rhenium removal during regeneration. Pre-eluent may be supplied from pre-eluent tank 36. Pre-eluting at least one of sulfate ions or chloride ions may comprise backwashing (i.e., in the second direction countercurrent to the first direction in which filtered feedstock 12 is loaded) the columns 24, 26, 28, 30 with a weak concentration of a strong base at a rate of between about three BVH and about seven BVH, with about four BVH being preferred. In one embodiment, columns 24, 26, 28, 30 were backwashed with a pre-eluent of 0.25M NaOH solution at a feed rate of about four BVH for about one hour. The pre-eluent expelled by the ion exchange system 22 may be recycled into the supply of feedstock 12, as shown in FIG. 1, for example.

Method 100 further comprises eluting 118 trace amounts of rhenium from the weak base anionic ion exchange resin using a first amount of eluent, a second amount of the eluent and a third amount of the eluent, the first amount and the third amount producing supplemental feedstock and the second amount producing rhenium eluate. Eluent may be provided from eluent tank, as shown in FIGS. 1-2. Again, columns 24, 26, 28, 30 may be backwashed with eluent in the second direction countercurrent to the first direction. In one embodiment, the eluent was 1.0 M NaOH, backwashed through ion exchange system 22 at a rate of 4 BVH for about 90 minutes with the total amount of eluent used being 6 bed volumes. The first amount of eluent was two bed volumes. After the first amount of two bed volumes of 1.0 M NaOH exited the columns 24, 26, 28, 30, the first amount was recycled into feedstock 12. The second amount of eluent was also two bed volumes of 1.0 M NaOH. After the second amount of two bed volumes of 1.0 M NaOH exited the columns 24, 26, 28, 30, rhenium eluate was produced. Rhenium eluate comprises sodium rheniate ($NaReO_4$) in solution. Rhenium eluate may be sent to rhenium eluate collection vessel 42 in a step of collecting 120 rhenium eluate. The third amount of eluent was two bed volumes. After the third amount of two bed volumes of 1.0 M NaOH exited the columns 24, 26, 28, 30, the third amount may be recycled into feedstock 12, since the concentration of rhenium eluted in the third amount was very low (e.g., too low to be included in rhenium eluate), although the invention should not be viewed as being limited in this respect.

Method 100 further comprises re-washing the weak base anion ion exchange resin with reverse osmosis water or decontaminated water to remove excess eluent. Re-washing may be done in the second direction countercurrent to the first direction which the ion exchange system 22 was loaded. In one embodiment of method 100, columns 24, 26, 28, and 30 were backwashed (e.g., re-washed) with reverse osmosis water from reverse osmosis unit 34 to remove excess NaOH. Re-washing water exiting ion exchange system 22 may be recycled as raffinate 16, as shown in FIGS. 1-2.

After the eluting 118, method 100 comprises protonating 122 the weak base ion exchange resin with protonation acid $H_2SO_4$. Protonation acid may be contained in protonation acid tank 40, as shown in FIGS. 1-2. Columns 24, 26, 28, 30 may be backwashed with protonation acid. In one embodiment of the present invention, the concentration of $H_2SO_4$ was 5 g/L. At least six BVH were used and were fed into columns 24, 26, 28, 30 at a rate of four BVH in the second direction countercurrent to the first direction of loading with filtered feedstock 12. Amounts of protonation acid in excess of six bed volumes may be used to ensure that the weak base anion resin is fully recharged. Protonation acid exiting ion exchange system 22 may be recycled as raffinate 16 into raffinate tank 17, as shown in FIGS. 1-2.

Following regeneration, method 100 may begin again over a cycle that ranges from about 35 to about 65 days. In one embodiment, repeating method 100 may take place over a 40-day cycle to effect recovery rates of trace amounts of rhenium of at least about 90 percent (e.g., 89.6 percent); however, recovery rates may vary based on the rhenium concentration in the feedstock. In another embodiment of the present invention, the cycle was 65 days.

Rhenium eluate may be subject to additional processing to produce rhenium metal; however, it may also be sold as a commercial product in solution.

Method 100 may comprise an optional step if rhenium eluate comprises chlorides or sulfates. If sampling during the process of method 100 reveals presence of chlorides or sulfates in the rhenium eluate, method 100 may comprise adding $H_2SO_4$ to the rhenium eluate until the pH is about 2.0, or otherwise determining that the pH is about 2.0. Method 100 further comprises feeding the pH-adjusted rhenium eluate back through ion exchange system 22. In one embodiment ion exchange system 22 comprises a supplemental column in which the pH-adjusted rhenium eluate may be fed through the supplemental column in the first direction very slowly at a rate of about one BVH. $H_2SO_4$ exiting the ion exchange system 22 may be recycled as raffinate 16.

Method 100 has been described in which feedstock 12 is fed into the ion exchange system 22 in the first direction and other fluids are fed in the second direction; however, the invention should not be viewed as being limited in this respect.

Figure 4:
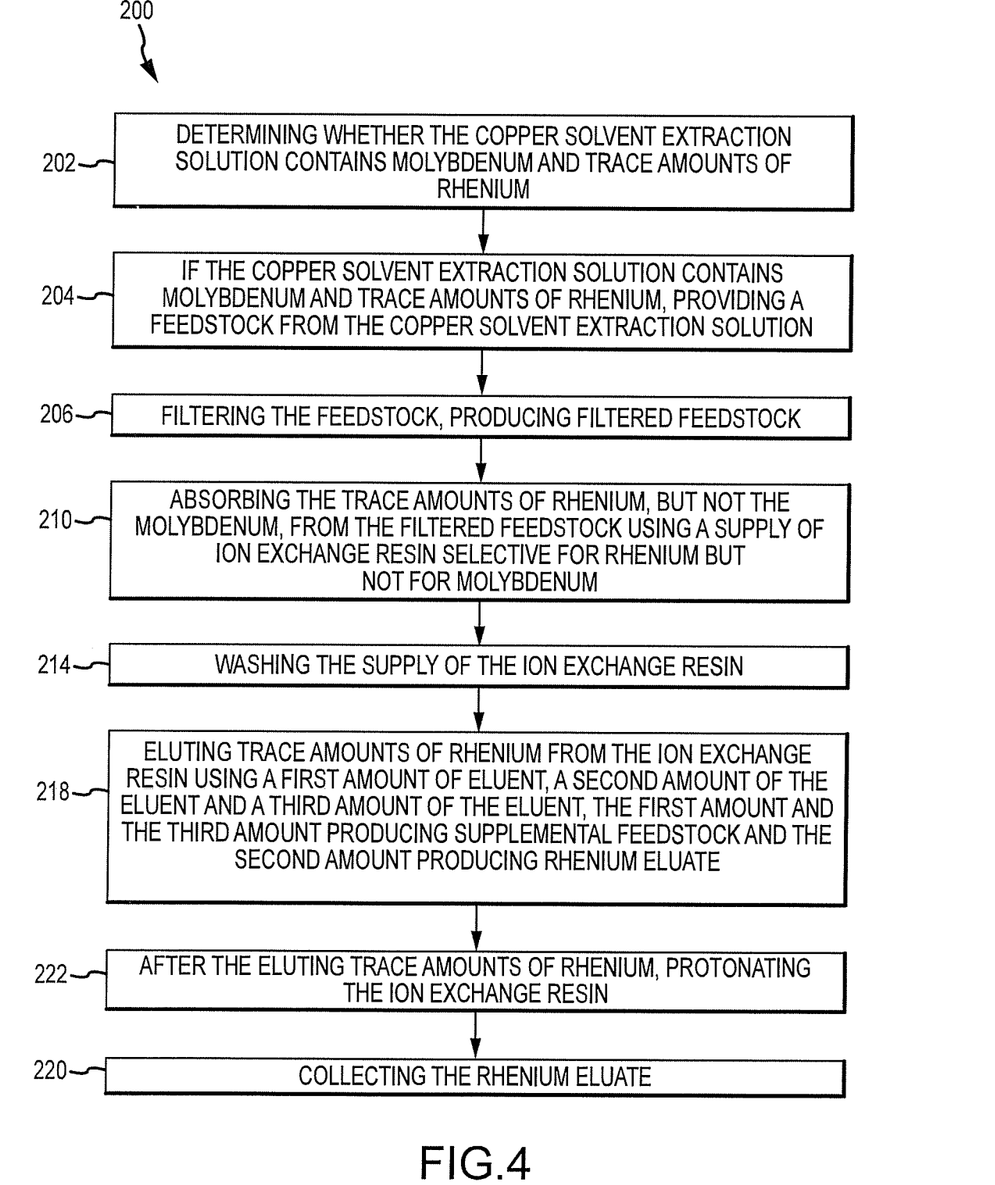
FIG. 4 shows an embodiment of the method of the present invention for extracting trace amounts of rhenium from a copper solvent extraction solution also containing molybdenum.

In another embodiment also illustrated in FIG. 1, the present invention comprises method 200 for trace amounts of rhenium from copper SX solutions in the presence of molybdenum in an amount greater than about 20 ppm. Thus, as illustrated in FIG. 4, method 200 comprises determining 202 whether the copper SX solution (e.g., PLS 14 or raffinate 16) contains trace amounts of rhenium and molybdenum exceeding 20 ppm. If the copper SX solution contains trace amounts of rhenium, method 200 comprises providing 204 feedstock 12 from the copper SX solution. Providing 204 feedstock may comprise removing the slip stream of PLS 14 from SX system 44 for rhenium recovery prior to the addition of organic to the PLS. In an embodiment in which feedstock 12 comprises raffinate 16, raffinate 16 may be diverted from SX system 44 at the end of the SX circuit. In either case, it is not necessary to adjust the pH of either the PLS 14 or the raffinate 16 as embodiments of method 200 work without adjusting the pH of feedstock 12 since the method 200 of the present invention can be performed in an environment of a pH of 4.0 or lower.

Method 200 further comprises filtering 206 the feedstock 12 to produce filtered feedstock 12. In an embodiment in which feedstock 12 comprises PLS 14, filtering 206 comprises filtering 206 according to known methods for removing solids. In one embodiment in which feedstock 12 comprises PLS 14, PLS 14 is supplied to filter system 19 where it is filtered by filter 18. In addition, filtering 206 does not include use of any activated charcoal. It is now appreciated that activated charcoal absorbs rhenium and negatively affects operation of method 200.

Method 200 further comprises providing a supply of the weak base anion ion exchange resin selective for rhenium but not for molybdenum, as previously described, which may be loaded into columns 24, 26, 28, 30 of ion exchange system 22, connected in parallel, as shown in FIG. 1. Once the columns 24, 26, 28, 30 have been loaded with the weak base anion ion exchange resin, filtered feedstock 12 may be fed into the columns 24, 26, 28, 30 in the first direction at a rate of between about 0.5 BVH to about 8 BVH, with about 3-4 BVH being preferred until rhenium begins coming out of the columns 24, 26, 28, 30. In one embodiment, filtered feedstock 12 was loaded into the columns 24, 26, 28 30 from the top down. Given the slower reaction kinetics of the ion exchange resin used in embodiments of method 200, rates for performing steps of method 200 are generally slower and the steps take longer than in embodiments of method 100. Thus, method 200 further comprises absorbing 210 the trace amounts of rhenium from the filtered feedstock 12 using a supply of weak base anion ion exchange resin selective for rhenium but not for molybdenum. In an embodiment in which filtered feedstock 12 comprises PLS 14, the filtered PLS 14 that passes through the ion exchange system 22 may be recycled to the SX system 44 for copper extraction and/or molybdenum extraction if the PLS contains sufficient quantities of molybdenum, as shown in FIG. 1.

Following the absorbing 210 step, method 200 further comprises washing 214 the supply of the weak base anion ion exchange resin with decontaminated water (e.g., water that has been subjected to reverse osmosis) until substantially all of the filtered feedstock 12 has been displaced. Reverse osmosis water may be supplied from reverse osmosis unit 34, as shown in FIG. 1. In one embodiment of method 200, the washing 214 with decontaminated water may be performed in the second direction countercurrent to the first direction in which the columns 24, 26, 28, 30 were loaded with feedstock 12. The wash water exiting from the ion exchange system 22 may be recycled 216 as raffinate 16, as shown in FIG. 1.

Method 200 may also include the optional step of pre-eluting at least one of sulfate ions or chloride ions from the weak base anion ion exchange resin. Sulfate ions and chloride ions should be removed from the feedstock 12 to ensure efficient operation of rhenium removal during regeneration. Pre-eluent may be supplied from pre-eluent tank 36, as shown in FIG. 1. Pre-eluting at least one of sulfate ions or chloride ions may comprise backwashing (i.e., in the direction countercurrent to loading with the filtered feedstock 12) the supplemental column(s) of ion exchange systems 22 with a weak concentration of a strong base at a rate of between about one BVH and about five BVH. In one embodiment, the supplemental column was backwashed with the pre-eluent of 0.25M NaOH solution at feed rate of about two BVH for about one hour. The pre-eluent expelled by the ion exchange system 22 may be recycled into the supply of feedstock 12, as shown in FIG. 1, for example.

Method 200 further comprises eluting 218 trace amounts of rhenium from the weak base anionic ion exchange resin using a first amount of eluent, a second amount of the eluent and a third amount of the eluent, the first amount and the third amount producing supplemental feedstock and the second amount producing rhenium eluate. Eluent may be supplied from eluent tank 38, as shown in FIG. 1. Again, columns 24, 26, 28, 30 may be backwashed with eluent in the second direction countercurrent to the first direction in which columns 24, 26, 28, 30 were loaded with the filtered feedstock 12. In one embodiment, the eluent may comprise 1.0 M NaOH, backwashed through ion exchange system 22 at a rate of about two BVH with the total amount of eluent used being six bed volumes. The first amount of eluent may comprise two bed volumes. After the first amount of two bed volumes of 1.0 M NaOH has exited the columns 24, 26, 28, 30, the first amount may be recycled into feedstock 12. The second amount of eluent may also comprise two bed volumes of 1.0 M NaOH. After the second amount of two bed volumes of 1.0 M NaOH has exited the columns 24, 26, 28, 30, rhenium eluate would be produced and collected 220 in rhenium eluate collection vessel 42 containing the final product 48 (e.g., $NaReO_4$). Molybdenum would pass through ion exchange system 22 to be recycled as supplemental feedstock 12 or raffinate 16 as shown in FIG. 1.

After the third amount of two bed volumes of 1.0 M NaOH has exited the columns 24, 26, 28, 30, the third amount may be recycled into feedstock 12, since the concentration of rhenium eluted in the third amount would be very low, as previously described.

Method 200 further comprises re-washing the weak base anion ion exchange resin with reverse osmosis water or decontaminated water to remove excess eluent. Again, reverse osmosis water may be supplied from reverse osmosis unit 34. Re-washing may be done in the second direction countercurrent to the first direction in which ion exchange system 22 is loaded. In one embodiment of method 200, columns 24, 26, 28, and 30 may be backwashed (e.g., re-washed) with reverse osmosis water to remove excess NaOH. Re-washing water exiting ion exchange system 22 may be recycled as raffinate 16, as shown in FIG. 2.

After the eluting 220 of rhenium in rhenium eluate, method 200 comprises protonating 222 the weak base ion exchange resin with protonation acid $H_2SO_4$. Protonation acid may be supplied from protonation acid tank 40, as shown in FIG. 1. In one embodiment of the present invention, the concentration of $H_2SO_4$ may be 5 g/L. Columns 24, 26, 28, 30 may be backwashed with protonation acid. At least six bed volumes may be used and were fed into columns 24, 26, 28, 30 at a rate of 4 BVH in the second direction countercurrent to the first direction. Since the molybdenum will have passed through ion exchange system 22, the backwashing rates and volumes may be substantially the same in method 200 as in method 100, but this is not required. Amounts of protonation acid in excess of six bed volumes may be used to ensure that the weak base anion resin is fully recharged. Protonating acid exiting ion exchange system 22 may be recycled as raffinate 16, as shown in FIG. 1.

Following regeneration, method 200 may begin again over a cycle that ranges from about 35 to about 65 days. In one embodiment, repeating method 200 may take place over a 40-day cycle to effect recovery rates of trace amounts of rhenium of at least around 90 percent. In another embodiment of the present invention, the cycle was 65 days.

In addition, in embodiments of method 100, 200 rhenium eluate may be subject to additional processing to produce rhenium metal; however, rhenium eluate may also be sold as a commercial product as sodium rheniate ($NaReO_4$) in solution.

Method 200 has been described in which feedstock 12 is fed into the ion exchange system 22 in the first direction and other fluids are fed in the second direction; however, the invention should not be viewed as being limited in this respect.

EXAMPLES

Having generally discussed system 10 and method 100, 200 of the present invention, specific examples will now be discussed in order to provide further information regarding the invention. The examples presented below are representative only and are not intended to limit the invention in any respect.

Example 1

Feedstock 12 for Example 1 comprised raffinate 16 from the SX system 44 of the Ray Mine, located in Hayden, Ariz.

and owned by ASARCO, LLC. A one-inch stainless steel column, 36 inches long, was charged with 450 milliliters (mL) of conditioned Purolite® A170/4675 resin. Raffinate 16 was supplied to the column at a flow rate of 15 mL per minute. This process continued for a period of 60 days. During the rhenium recovery process according to an embodiment of method 100, neither the feedstock 12 of raffinate 16 entering the column, nor the discharge solution leaving the column, were sampled for rhenium. At the conclusion of the 60-day test period, the resin was stripped using four liters (L) of one molar (1M) sodium hydroxide (NaOH), creating a rhenium salt (NaReO$_4$) in solution.

Figure 5:
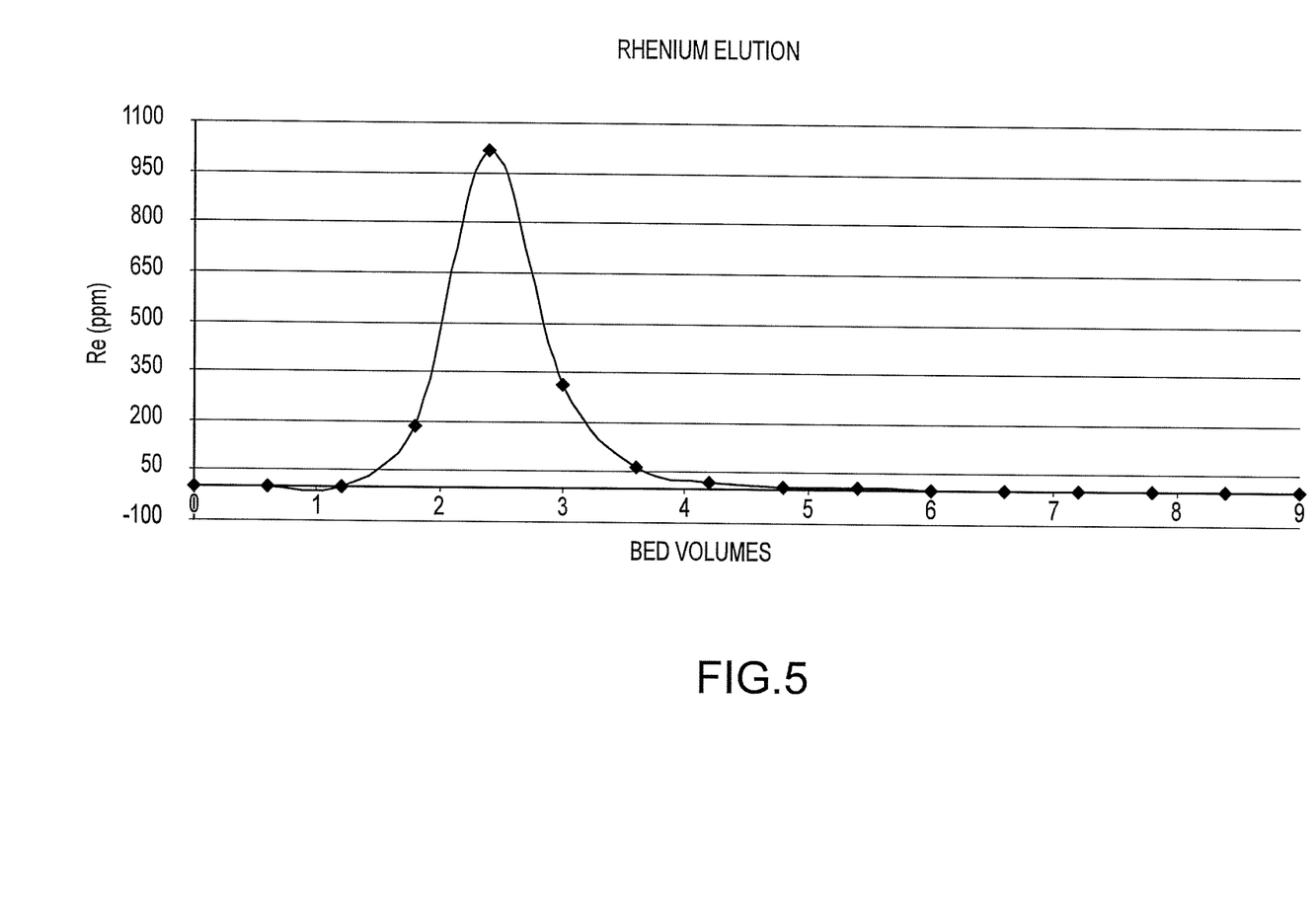
FIG. 5 shows an elution curve for the recovery of rhenium according to the embodiment of the invention as in Example 1.

FIG. 5 shows the elution curve for the recovery of rhenium from the resin in Example 1. The vertical axis of FIG. 5 is the concentration of rhenium in ppm and the horizontal axis is bed volume of 1 M NaOH stripping solution. Following the test, the weak base anion ion exchange resin was examined. The resin exhibited evidence that the entrained organic in the raffinate 16 interfered with the loading of rhenium and its eventual recovery.

Example 2

According to an embodiment of method 100, in Example 2, a one-inch stainless steel column, 36 inches long, was charged with 450 mL of new, conditioned Purolite® A170/4675 resin. The feedstock 12 comprised PLS 14 from the Ray Mine. The feed rate for PLS 14 entering the column was 40 mL per minute. The volumetric flow rate was 5.3 BVH. The test was conducted for 40 days, with a total of 2301 L of PLS 14 being treated in the ion exchange column. Rhenium concentration in the PLS was determined to be 0.41 ppm by inductively coupled plasma mass spectrometry (ICP) analysis; however, test data revealed that the head was actually closer to 0.61 ppm, as shown in Table 1 below. The error is due to the fact that the ICP mass spectrograph was calibrated at 1.0 ppm, reducing accuracy because the head is approximately half of the calibrated value. Rhenium concentration of the column raffinate averaged 0.03 ppm. Rhenium was stripped or eluted from the resin using 1.0 M NaOH solution of eluent. A 40 mL sample was taken every five minutes, as shown in Table 1. The remaining rhenium eluate was collected in a bucket; the volume was 1620 mL. A representative sample was also taken, denoted in Table 1 as Strip Composite. Rhenium concentration of the strip composite was 692 ppm. The maximum rhenium concentration in the rhenium eluate was 2420 ppm, as shown in Strip 5, Table 1, for a concentration factor of 5000 to 1. As shown in Example 2, at least 93% of the rhenium was recovered from the PLS 14.

By material balance, as shown in Table 1, the total amount of rhenium loaded onto the resin column was 1.418 grams (g) of rhenium. The total capacity of the 450 mL of resin is approximately 45 g of rhenium. Although the test was conducted for 40 days, to operate the test to total breakthrough would have required 69,000 L of feedstock 12 (e.g., PLS 14) and 1200 days.

TABLE 1

Rhenium Elution Data

| Sample ID | Sample vol mL | Rhenium ppm (mg/L) | Total rhenium mg |
|---|---|---|---|
| Strip 1 | 40 | 0.12 | 0.0048 |
| Strip 2 | 40 | 0.12 | 0.0048 |
| Strip 3 | 40 | 19 | 0.76 |
| Strip 4 | 40 | 795 | 31.8 |
| Strip 5 | 40 | 2420 | 96.8 |
| Strip 6 | 40 | 2170 | 86.8 |
| Strip 7 | 40 | 1100 | 44 |
| Strip 8 | 40 | 490 | 19.6 |
| Strip 9 | 40 | 193 | 7.72 |
| Strip 10 | 40 | 49 | 1.96 |
| Strip 11 | 40 | 21 | 0.84 |
| Strip 12 | 40 | 7 | 0.28 |
| Strip 13 | 40 | 2.3 | 0.092 |
| Strip composite | 1620 | 692 | 1121.4 |

Figure 6:
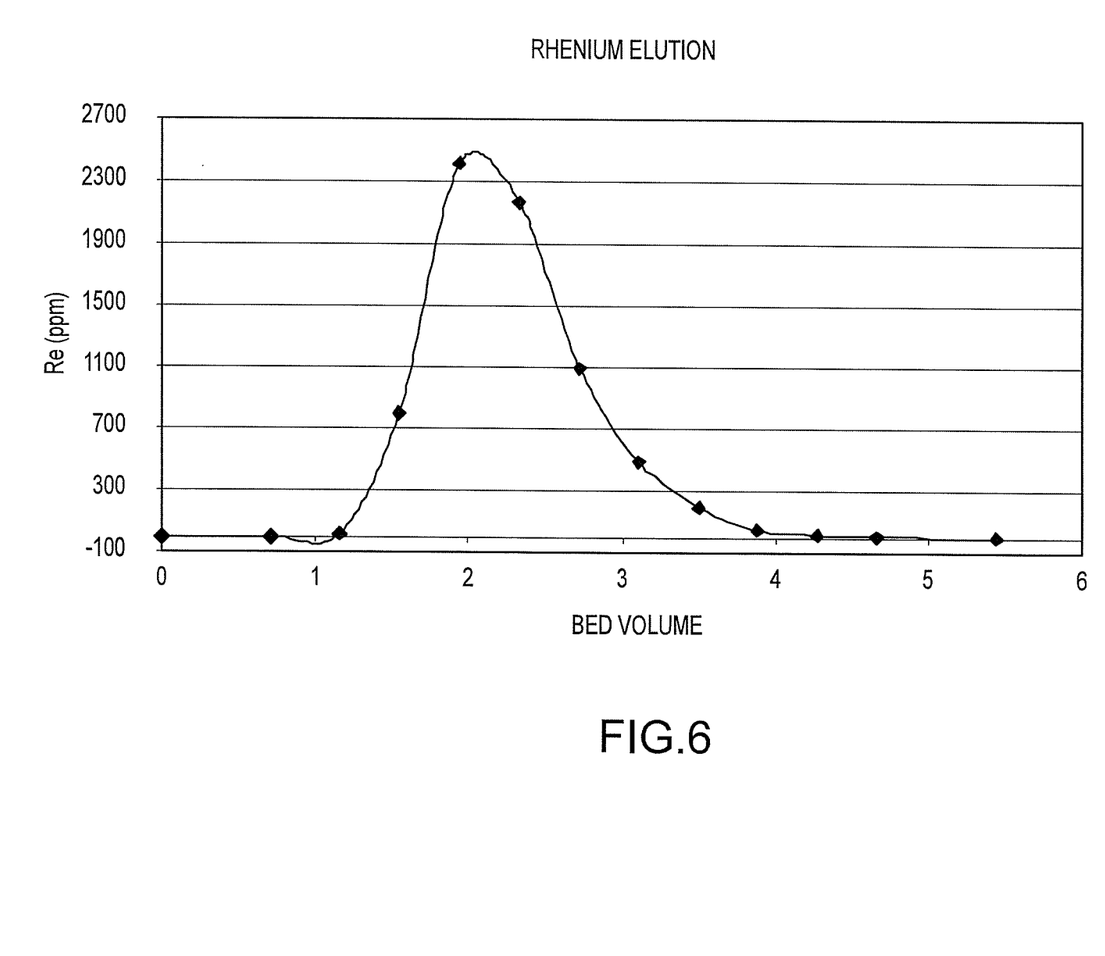
FIG. 6 shows an elution curve for the recovery of rhenium according to the embodiment of the invention as in Example 2.

Total milligrams of rhenium extracted 1412 mg
Total PLS volume processed 2301 L
Calculated Re conc. in PLS = 1412 mg/2301 L = 0.61 mg/L = 0.61 ppm FIG. 6 shows the elution curve for the recovery of rhenium from the resin in Example 2. The vertical axis of FIG. 6 is the concentration of rhenium in ppm and the horizontal axis is bed volume of 1.0 M NaOH eluent.

Figure 7:
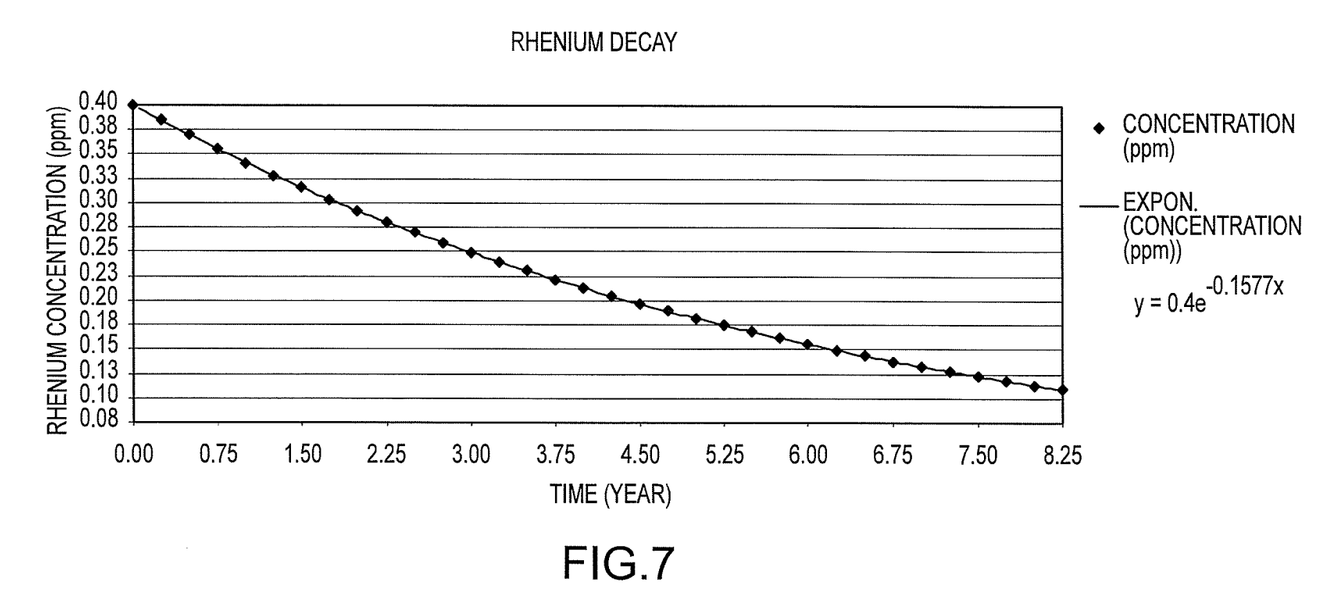
FIG. 7 shows a curve for a rate of rhenium decay.

In yet another embodiment of the method of the present invention, the feedstock 12 of PLS 14 could be fed into ion exchange system 22, comprising one or more ion exchange units (e.g., columns 24, 26, 28, 30), charged with ion exchange resin selective to hydrophobic, heavy metal anions, such as Purolite® A170/4675, at a rate of 300 gallons per minute (gpm) for 60 days, at which point rhenium would be eluted from the resin using 1.0 M NaOH, or other strong base, such as previously described. In the present embodiment, resin would be regenerated every 60 days, with some replacement required annually. Moreover, given the rate of rhenium decay, the method 100, 200 of the present invention may be conducted over a long period of time without significant rhenium loss. FIG. 7 shows the curve for rhenium decay. The vertical axis is rhenium concentration in ppm in the PLS 14; the horizontal axis is time in years. For example, as shown in FIG. 7, assuming no regeneration of rhenium in the PLS, with 1 billion lixiviate in inventory, it would take about eight years for rhenium concentration to be reduced from about 0.41 ppm to 0.1 ppm.

Example 3

For 68 days, a 14-inch diameter, four feet high ion exchange column 24 was operated for the recovery of rhenium from PLS 14 from the Ray Mine. The ion exchange system 22 was attached to the PLS 14 line coming from SX system 44. The system pressure was supplied by the head from a vat in SX system 44. The pressure drop through the system 10 was about 68.95 KPa (10 pounds per square inch (PSI)). The feedstock 12 to column 24 was the Ray PLS 14. The ion exchange resin was a weak base anion resin of the type previously described. The PLS 14 feed rate as an average of 2.8 gpm. The flow rate of 2.8 gpm is equivalent to 7 BVH. The maximum flow rate was 3.6 gpm and the minimum was 0.6 gpm. The total flow rate through the column was 225,490 gallons for a total of 1342 BV. The PLS flow rate was measured with a magnetic one inch flow meter. To prevent fouling of the ion exchange resin a 10-micron cartridge filter with activated carbon was used to filter the incoming PLS. The filter was changed every other day. The ion exchange column feedstock 12 and column raffinate 16 were sampled five days a week.

Sampling results and analysis indicated the rhenium concentration in the PLS 14 was an average of 0.58 ppm. The limit of valid analysis is 0.1 ppm so the majority of the raffinate analysis is reported as less 0.1 ppm. Assuming conservatively that the average value of the less than 0.1 is 0.05 ppm, the average rhenium concentration of the raffinate is 0.06 ppm. The recovery of the rhenium in this Example would be 89.6 percent. The results are show below in Table 2 and also in FIG. 8.

TABLE 2

| SAMPLE # | Re in pls (PPM) | Re in raff (ppm) |
|---|---|---|
| 1 | 0.6 | <0.1 |
| 2 | 0.6 | <0.1 |
| 3 | 0.5 | <0.1 |
| 4 | 0.5 | <0.1 |
| 5 | 0.5 | <0.1 |
| 6 | 0.6 | <0.1 |
| 7 | 0.6 | <0.1 |
| 8 | 0.7 | <0.1 |
| 9 | 0.6 | <0.1 |
| 10 | 0.6 | <0.1 |
| 11 | 0.6 | <0.1 |
| 12 | 0.5 | <0.1 |
| 13 | 0.6 | <0.1 |
| 14 | 0.6 | <0.1 |
| 15 | 0.5 | <0.1 |
| 16 | 0.6 | 0.1 |
| 17 | 0.6 | 0.1 |
| 18 | 0.6 | 0.1 |
| 19 | 0.6 | 0.1 |
| AVERAGE | 0.58 | 0.06 |

Rhenium recovery = (0.58 − 0.06)/(0.58) * 100 = 89.6 percent

Figure 8:
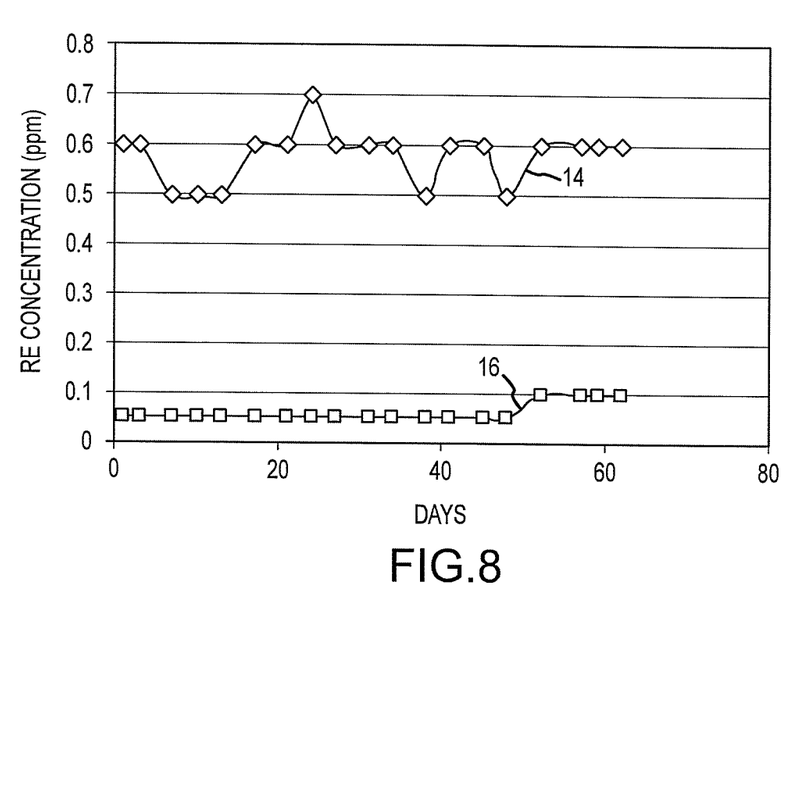
FIG. 8 shows rhenium recovery results according to an embodiment of the invention in Example 3.

The break through curve is also shown in FIG. 8. The horizontal axis shows the number days the column was operated. The average flow rate was 2.8 gpm. The vertical axis shows the concentration of rhenium in the PLS 14 or the raffinate 16. The threshold of the analysis for rhenium is 0.1 ppm. Assuming conservatively that the average rhenium concentration is 0.05 ppm, the average concentration of the raffinate 16 exiting the ion exchange column 24 that was analyzed of less than 0.1 ppm, the average raffinate 16 from the test was 0.06 ppm. The average head analysis is 0.58 ppm. The amount of rhenium recovered from the column 24 was:

(225490)*(3.785)*(0.58−0.06)/1000=443 grams of rhenium.

Eluate from the test was analyzed several times and was reported as having a rhenium concentration of 1100 ppm, 1400 ppm and 1450 ppm. Based on the various analyses, total rhenium recovery was between 226 grams and 283 grams, resulting in a 36 percent error. It was reported that the rhenium eluate contained organic material that is believed to have interfered with rhenium recovery. A cartridge filter containing activated carbon had been used. When the ion exchange column 24 was opened, black material was evident all over the resin. Backwashing of the column 24 to produce rhenium eluate caused a large amount of the black material to come out of the column. The black material was probably from the activated carbon from the filter. Thus, it is believed that the error in rhenium recovery resulted from using activated carbon in part of the process, since further testing revealed that activated charcoal will absorb rhenium from acid solutions. Table 3 below is a list of other elements found in the rhenium eluate.

TABLE 3

| ELEMENT | PPM CONC |
|---|---|
| Al | <0.1 |
| Ca | 1.0 |
| Cu | 2.5 |
| Fe | 13.0 |
| Mo | <0.1 |
| Na | 16475 |
| Re | 1450 |
| P | <0.1 |
| S | 5245 |
| Si | 310 |
| U | 37 |
| Zn | <0.1 |
| As | 3 |

While only selected embodiments have been chosen to illustrate the present invention, it will be apparent to those of ordinary skill in the art from this disclosure that various changes and modifications can be made herein without departing from the scope of the invention as defined in the appended claims. For example, the size, shape, location or orientation of the various components disclosed herein can be changed as needed or desired. Components that are directly connected may have intermediate structures between them. The functions of two or more elements or units may be performed by one and vice versa. The structures, steps, and functions of one embodiment may be adopted in another embodiment. It is not necessary for all advantages to be present in a particular embodiment at the same time. In addition, terms of degree such as "substantially," "about," and "approximate" as used herein mean a reasonable amount of deviation of the modified term such that the result would not be changed. For example, these terms can be construed as including a deviation of at least ±5% of the modified term if this deviation would not negate the meaning of the term it modifies. Thus, it is contemplated that the inventive concepts herein described may be variously otherwise embodied and it is intended that the appended claims be construed to include alternative embodiments of the invention, except insofar as limited by the prior art. The invention shall therefore only be construed in accordance with the following claims:

What is claimed is:

1. A method of recovering rhenium from copper solvent extraction solution, comprising:
    Determining that the copper solvent extraction solution contains trace amounts of rhenium;
    Providing a feedstock from the copper solvent extraction solution, the feedstock comprising trace amounts of rhenium;
    Filtering the feedstock, producing filtered feedstock;
    Absorbing the trace amounts of rhenium from the filtered feedstock using a supply of ion exchange resin selective for rhenium;
    Washing the supply of the ion exchange resin;
    Eluting trace amounts of rhenium from the ion exchange resin using a first amount of eluent, a second amount of eluent and a third amount of eluent, the first amount and the third amount producing supplemental feedstock and the second amount producing rhenium eluate;
    Collecting the rhenium eluate; and
    After the eluting, protonating the ion exchange resin.

2. The method of claim 1, wherein washing the supply of ion exchange resin comprises washing the supply of ion exchange resin until substantially all of the feedstock has been displaced.

3. The method of claim 1, wherein the eluent comprises a strong base.

4. The method of claim 3, wherein the strong base comprises a hydroxide formed from a Group I or Group II metal.

5. The method of claim 3, wherein the strong bases comprises one selected from the group consisting of sodium hydroxide, potassium hydroxide, lithium hydroxide and cesium hydroxide.

6. The method of claim 1, wherein the protonating comprises passing sulfuric acid through the supply of the ion exchange resin.

7. The method of claim 1 wherein the first amount, the second amount and the third amount are equal to one another.

8. The method of claim 7, wherein the first amount, the second amount and the third amount are about four bed volumes per hour.

9. The method of claim 1, wherein the absorbing comprises feeding feedstock solution to the ion exchange resin at a rate of about between about 0.5 bed volumes per hour to about 8 bed volumes per hour.

10. The method of claim 9, wherein the rate is about 5 bed volumes per hour.

11. The method of claim 1, wherein the ion exchange resin is a weak base anionic resin.

12. The method of claim 1, further comprising recycling the supplemental feedstock into the feedstock.

13. The method of claim 1, further comprising:
Analyzing the rhenium eluate for presence of at least one of a sulfate or a chloride thereby making the rhenium eluate contaminated rhenium eluate;
Lowering the pH of the contaminated rhenium eluate;
Absorbing the trace amounts of rhenium from contaminated rhenium eluate using the supply of the first ion exchange resin;
Washing a supplemental supply of the ion exchange resin;
Re-eluting trace amounts of rhenium from the ion exchange resin using the first amount of the eluent, the second amount of the eluent and the third amount of the eluent, the first amount and the third amount producing supplemental feedstock and the second amount producing supplemental rhenium eluate;
Collecting the supplemental rhenium eluate; and
After the re-eluting, protonating the supplemental supply of ion exchange resin.

14. The method of claim 1, wherein the feedstock comprises raffinate and the filtering comprises removing solids and removing entrained organic.

15. The method of claim 14, wherein the filtering does not include using activated charcoal.

16. The method of claim 14, wherein the removing entrained organic comprises using a second ion exchange resin.

17. The method of claim 1, wherein providing the feedstock comprises providing the feedstock without adjusting a pH of the feedstock.

18. The method of claim 1, further comprising pre-eluting at least one of sulfate ions or chloride ions from the ion exchange resin.

19. A method of recovering rhenium from copper solvent extraction solution, comprising:
Determining that the copper solvent extraction solution contains molybdenum and trace amounts of rhenium;
Providing a feedstock from the copper solvent extraction solution, the feedstock comprising molybdenum and trace amounts of rhenium;
Filtering the feedstock, producing filtered feedstock;
Absorbing the trace amounts of rhenium but not the molybdenum from the filtered feedstock using a supply of ion exchange resin selective for rhenium but not for molybdenum;
Washing the supply of the ion exchange resin;
Eluting trace amounts of rhenium from the ion exchange resin using a first amount of a eluent, a second amount of the eluent and a third amount of the eluent, the first amount and the third amount producing supplemental feedstock and the second amount producing rhenium eluate;
After the eluting of trace amounts of rhenium, protonating the ion exchange resin; and
Collecting the rhenium eluate.

20. The method of claim 19, wherein the protonating the ion exchange resin comprises backwashing the ion exchange resin with sulfuric acid in solution.

21. The method of claim 19, wherein the absorbing comprises feeding filtered feedstock into the ion exchange resin in a first direction and the eluting comprises backwashing the ion exchange resin with the first amount, second amount and third amount of eluent in a second direction.

22. The method of claim 19, further comprising pre-eluting at least one of sulfate ions or chloride ions from the ion exchange resin.

23. The method of claim 19, wherein providing the feedstock comprises providing the feedstock without adjusting a pH of the feedstock.

* * * * *